United States Patent [19]
Schulz et al.

[11] Patent Number: 6,126,205
[45] Date of Patent: Oct. 3, 2000

[54] CONNECTION TOOL FOR LOW PROFILE CONNECTIONS

[75] Inventors: Gary A. Schulz, Arlington Heights; Jeffrey E. Burgard, Lombard, both of Ill.

[73] Assignee: UOP LLC, Des Plaines, Ill.

[21] Appl. No.: 09/190,927

[22] Filed: Nov. 12, 1998

[51] Int. Cl.[7] .................................................. F16L 55/00
[52] U.S. Cl. .............................. 285/18; 285/412; 285/368
[58] Field of Search ..................................... 285/368, 414, 285/412, 420, 18

[56] References Cited

U.S. PATENT DOCUMENTS

| | | | |
|---|---|---|---|
| 1,571,870 | 2/1926 | Peterson | 285/412 |
| 1,625,684 | 4/1927 | Roddy | 285/412 |
| 2,138,135 | 11/1938 | Boucher | 285/368 |
| 3,694,007 | 9/1972 | Crow et al. | 285/368 |
| 4,159,132 | 6/1979 | Hitz . | |
| 5,131,632 | 7/1992 | Olson . | |
| 5,152,556 | 10/1992 | Holland et al. . | |
| 5,265,917 | 11/1993 | Hitz . | |

Primary Examiner—Lynne H. Browne
Assistant Examiner—Aaron Dunwoody
Attorney, Agent, or Firm—John G. Tolomei

[57] ABSTRACT

The assembly of a connection that uses cooperating grooved surfaces to provide an easily disassembled and assembled connection is improved by a tool that clamps separate brackets onto the two ends of the pipe connection and radially and axially aligns pipe ends as a bolt draws the two brackets together. Drawing the brackets together causes contact between alignment surfaces that provide radial and axial alignment of the separate connection halves for installation of pipe connection links. No additional clamping means is needed to provide any necessary force to keep the connector faces of the connection ends sufficiently close together for placement of the links and the addition of the locking ring or other retaining means. The tool prevents disengagement of the link members from engagement with the grooves on either connection end before the locking sleeve is placed over the links. The tool also provides a recess for retaining the locking ring until needed for holding the links in place. The tool is particularly for the compact installations where low profile connections are most useful and may fit on the connection ends of a pipe without requiring large amounts of radial clearance around the pipe ends.

20 Claims, 3 Drawing Sheets

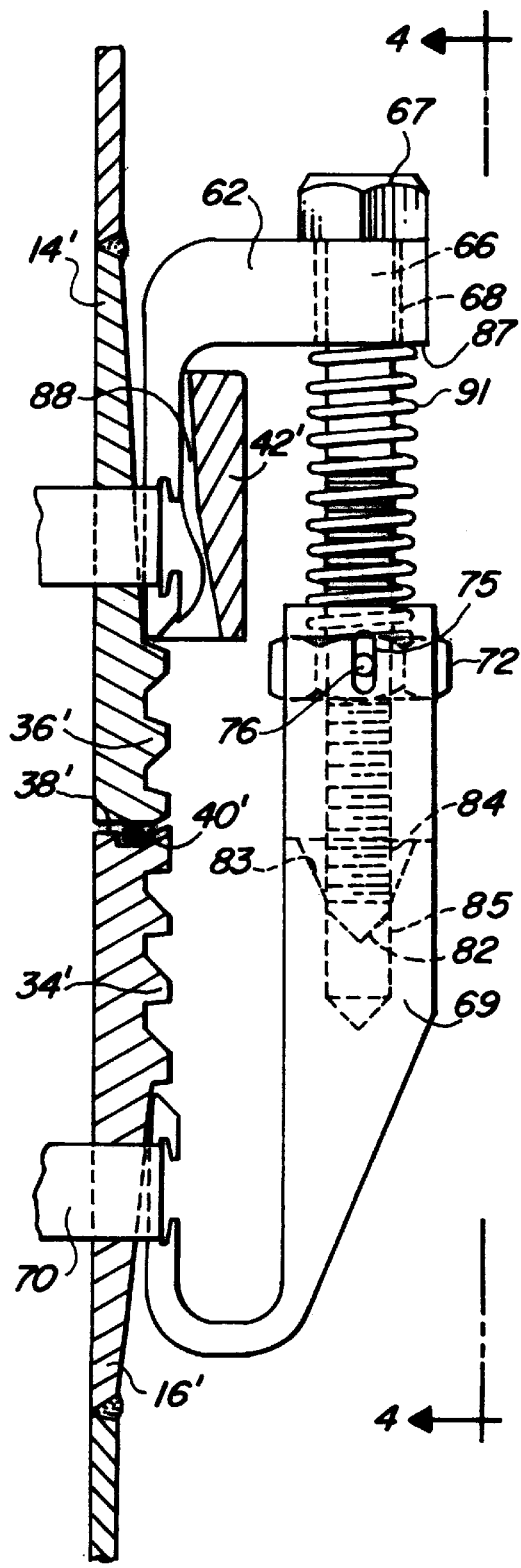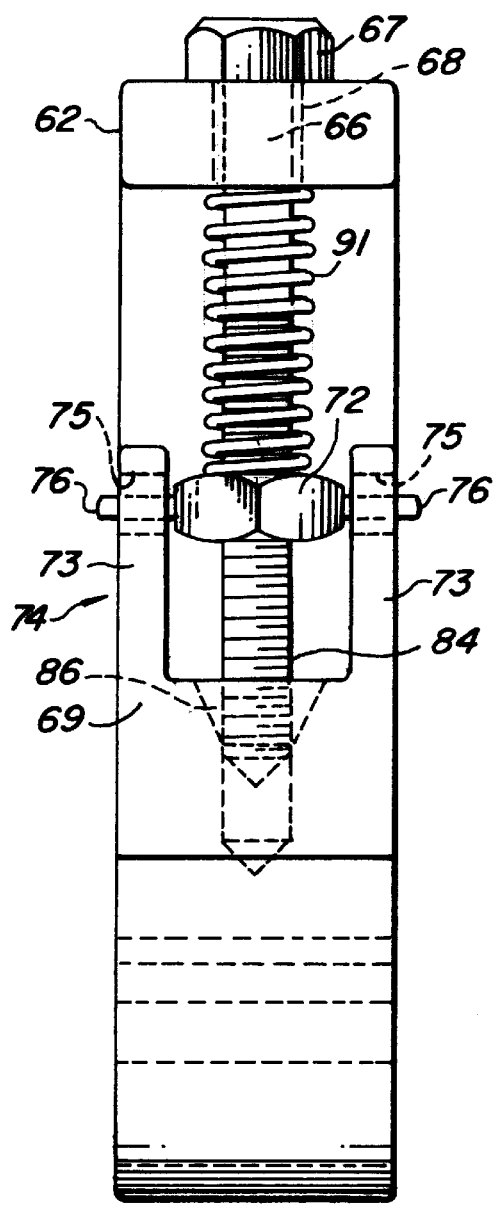

CONNECTION TOOL FOR LOW PROFILE CONNECTIONS

BACKGROUND OF THE INVENTION

This invention relates generally to the connection of conduits with connectors that are readily coupled and uncoupled in conduit systems. This invention further relates to connection that have a low profile and an outer locking member that extends at least partially around the connection

BACKGROUND OF THE INVENTION

Connectors for conduits such as piping systems where the pipes are not suitable for use with screwed connections are well known. One of the most common forms of such connection is the well known flange connection having bolts for assembly and disassembly of the connection. Alignment of bolted flanges has been provided in a number of ways. The most basic way to align bolted flanges is by the use of the bolts and the tightening sequence to simultaneously draw the flange halves together and align the centerlines of both flanges.

Another well known type of connection uses a series of machined grooves on the ends of pipes that are connected by bridging links that have complementary grooves for engaging the grooves on the pipe ends. A sleeve or other retaining means is used to hold the link members against the pipes and the cooperating grooves in engagement. Different forms of these types of connections can be seen in U.S. Pat. Nos., 5,152,556; 5,265,917; 5,131,632 and 4,159,132. These references describe groove and link type pipe connections that have a number of common elements. The connections include two connection halves having connector faces at each end of each connection half. Each connection half defines an external contact surface that extend at least intermittently around the periphery of each connection half in a transverse direction. Each external contact surface faces away from its respective connector face and extends from the outer surface of each connection half at an angle of at least 90 degrees with respect the axis of the connection halves to define a perpendicular or a ramped surface. At least two links extend partially around the outside of the first and second connection halves with each link defining contact surfaces that extend at least partially around the interior of each link for engaging the external contact surfaces. A locking member extending at least partially around and in engagement with the links to securely engage the contact surfaces of the links with the external contact surfaces.

One difficulty with groove and link type connections has been in their field assembly. The ends of pipes to be connected often extend from equipment and or piping arrangement that do not provide perfect alignment for engagement of the links in the grooves of the pipe ends. In the assembly of these connections, the pipe ends must be perfectly aligned in the radial or the axial direction for the retaining links to be applied to the outside of the pipe ends. The ends must be maintained in perfect alignment and the links held in place while an attachment sleeve is slid over the links to retain them in place. The assembly of these groove type connections can create problems in field assembly due to the difficulty of maintaining the alignment of the center line of the connection ends while the linking members are put in place and the annular ring or other retaining device secures the locking of the linking members in place. The problem is exacerbated due to the fact that the faces of both connection ends may be perfectly smooth for most commonly used gasket styles. This allows them to easily slide out of alignment relative to each other with little or no external force supplied. This leads to a difficult and inefficient assembly that requires one or two persons to manually maintain the alignment of the pipe ends while another person attaches the link members and the tapered ring that holds them in place.

Previously mentioned U.S. Pat. No. 4,159,132 issued to G. L. Hitz teaches the use of a clamping method to draw both halves of the pipe ends into place about their contact faces. The clamping mechanism however does not provide the necessary lateral alignment and stability for the two halves during assembly of the links and locking of the retaining means on the links.

U.S. Pat. No. 6,047,996, the contents of which are herein incorporated by reference, discloses the use of the tapered surface on the face of connections to facilitate alignment of pipe ends when joining connections.

SUMMARY OF THE INVENTION

An object of this invention is to facilitate the installation of grooved and link-type connections.

Another object of this invention is to provide a removable self-aligning structure for pipe connection ends.

This invention is a connection tool that radially and axially aligns pipe components when installing pipe connections of the groove and link type. Separate brackets of the tool clamp onto the two ends of the pipe connection. A tensioner, such as a bolt or a lever actuated closure device, draws the two brackets together. As the brackets are drawn together the brackets or the bolt and a bracket have interacting alignment surfaces that provide radial and axial alignment of the separate connection halves for installation of the links. No additional clamping means is needed to provide any necessary force to keep the connector faces of the connection ends sufficiently close together for placement of the links and the addition of the locking ring or other retaining means. The single tool will prevent the disengagement of the link members from engagement with the grooves on either connection end before the retaining sleeve or locking sleeve can be placed over the links. The tool also provides a recess for retaining the locking ring until it is needed to secure the links in place.

The tool is intended particularly for the compact installations where low profile connections are most useful. The bracket and clamp elements of the tool may fit on to the connection ends of the pipe and be used without large amounts of radial clearance around the pipe ends. In addition the significant radial projection or clearance requirements of the tool may be confined to a small sector of the outer pipe connection circumference. Thus the connection tool of this invention offers a solution to the installation problems for most low profile connections. Moreover, this invention overcomes the disadvantage that the lack of bolt holes presents when installing and aligning these connections.

Accordingly in one embodiment this invention is a connection tool for joining groove and link type connections halves. The specific of the type of connection to which this invention applies is one that joins conduits in a piping arrangement about a primary axis and uses first and second connection halves having connector faces at each end of each connection half. External contact surfaces, defined by each connection half, extend at least intermittently around the periphery of each connection half in a transverse direction. Each external contact surfaces faces away from its respective connector face and extends from the outer surface of each connection half at an angle of at least 90 degrees with respect the axis of the connection halves to define a perpendicular or a ramped surface. At least two links, when installed, each extend partially around the outside of the first and second connection halves, each link defining contact surfaces that extend at least partially around the interior of each link for engaging the external contact surfaces. A locking member extends at least partially around and in engagement with the links to securely engage the contact surfaces of the links with the external contact surfaces. The connection tool includes a first bracket for engaging a portion of the first connection half. The bracket is offset from the contact surface of the first connection half. A first clamp secures the first self centering link with respect to the first connection half. A second bracket engages a portion of the second connection half that is again axially removed from the contact surface of the second connection half. A tensioner has an extended position for joining the first and second brackets while the first and second connection halves are misaligned and a contracted position that coaxially aligns the first and second connection halves by drawing the first and second brackets closer together. Drawing of the brackets together produces aligning engagement between a first alignment surface defined by the first bracket and a second alignment surface defined by the tensioner or the second bracket. A recess defined by the first or second bracket retains the locking ring in a position that is axially removed from the contact surface of each connection half.

In a more limited embodiment this invention is a connection tool for joining pipe connectors that uses a bolt having a contact surface at its distil end in combination with a retaining bracket having a bolt retainer for retaining the bolt and a receiving bracket having an alignment surface. The receiving bracket retains a threaded member for engaging the threads of the bolt and bringing the retaining and receiving brackets into axial and angular alignment by movement of the contact surface along the alignment surface. The receiving bracket and retaining bracket each have clamp retainers for securing, respectively, receiving and retaining clamps that secure each bracket to a different pipe connection end.

Other objects, embodiments and details of this invention can be more fully understood from the following detailed description of the drawings.

BRIEF DESCRIPTION OF THE DRAWINGS

FIG. 3 shows the tool of this invention attached to the pipe connection of FIG. 2 after the alignment of the connection ends.

FIG. 4 is a view of the pipe connection tool in the direction shown by lines 4—4 in FIG. 3.

DETAILED DESCRIPTION OF THE DRAWINGS

Figure 1:
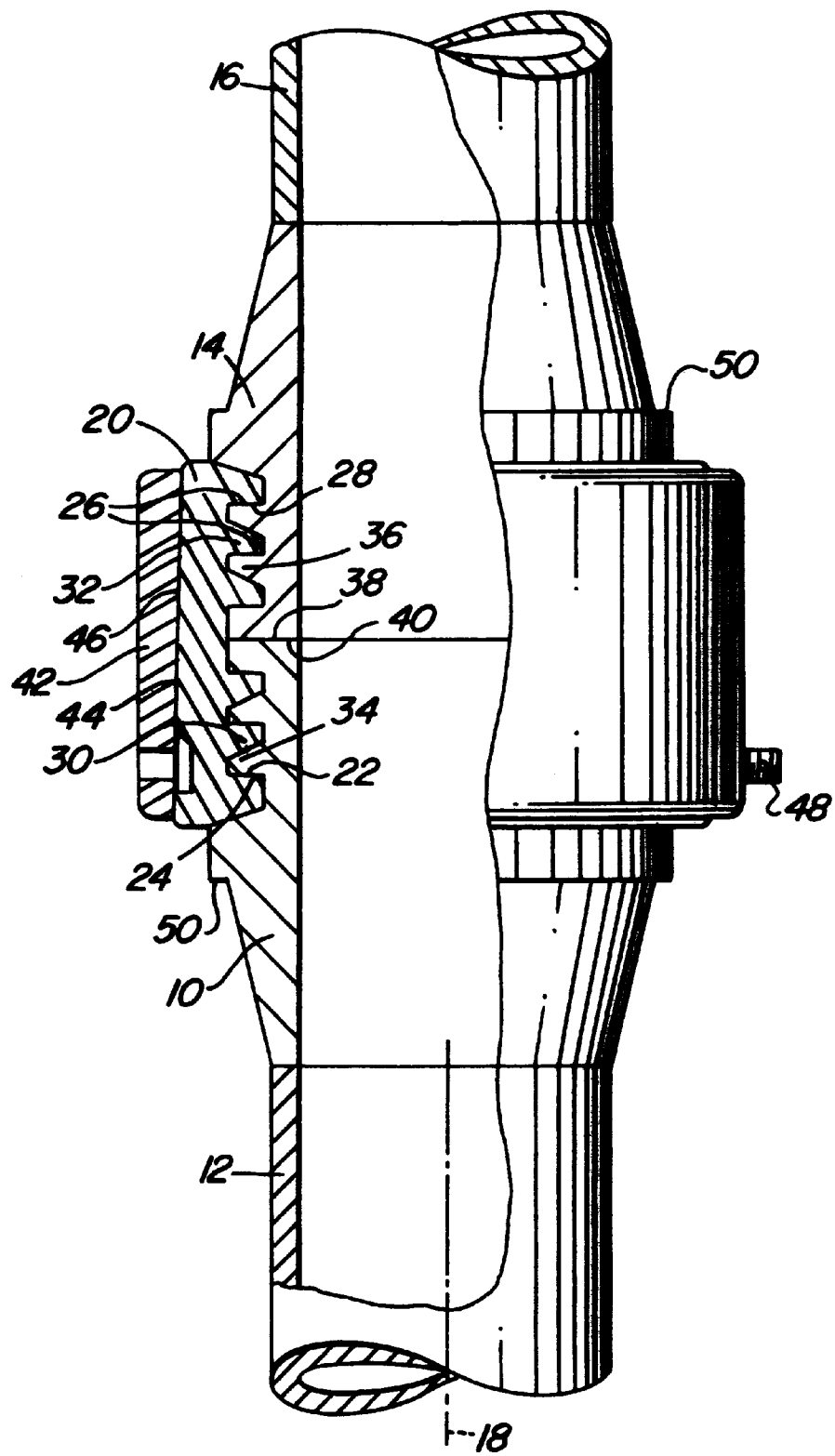
FIG. 1 is a partial section of an assembled pipe connection of the type for use with the tool of this invention.

FIG. 1 shows the groove and link type connection having a connection half 10 joined to a pipe end 12 and a connection half 14 joined to a pipe end 16. Connection halves 10 and 14 will usually have a cylindrical shape and be located at the end of pipes, in pressure vessels or on blind flange members. Connection halves 10 and 14 and pipe ends 12 and 16 are located about a common axis 18. Each connection half 10, 14 also defines an optional shoulder 50 for engagement with the tool of this invention in a manner hereinafter described.

At least two semi-cylindrical links 20 having contact surfaces 24 and 26 engage contact surfaces 22 and 28 on connector halves 10 and 14, respectively. A series of grooves defined by transversely extended ribs 30 and 32 on link 20 define the contact surfaces 26 and 24 respectively. Similarly transversely extended ribs 34 and 36 on connector halves 10 and 14 define contact surfaces 22 and 28. Contact surfaces 22 and 24, and contact surfaces 26 and 28 may extend perpendicularly from the link or connector halves or may have a small taper to urge connector faces 38 and 40 toward teach other. Contact surface may extend all the way around pipe ends and over the entire transverse length of the link or may be formed as intermediate sections of contact surfaces over only a portion of the transverse length of the links and the connector halves.

Links 20 are held in place by an annular sleeve 42 that serves as a locking ring and has a sloped surface 44 for engagement with a complementary sloped surface 46 on the outside of the links 20. A set screw 48 or other similar attachment device may be used to keep sleeve 42 in place over links 20. The types of retaining devices are not limited to structures such as sleeve 42. Any suitable retaining structure or mechanism could be used such as a clamp arrangement. Contact faces 40 and 38 will contain an optional lip structure as more fully disclosed in the previously referenced U.S. Pat. No. 6,047,996.

Figure 2:
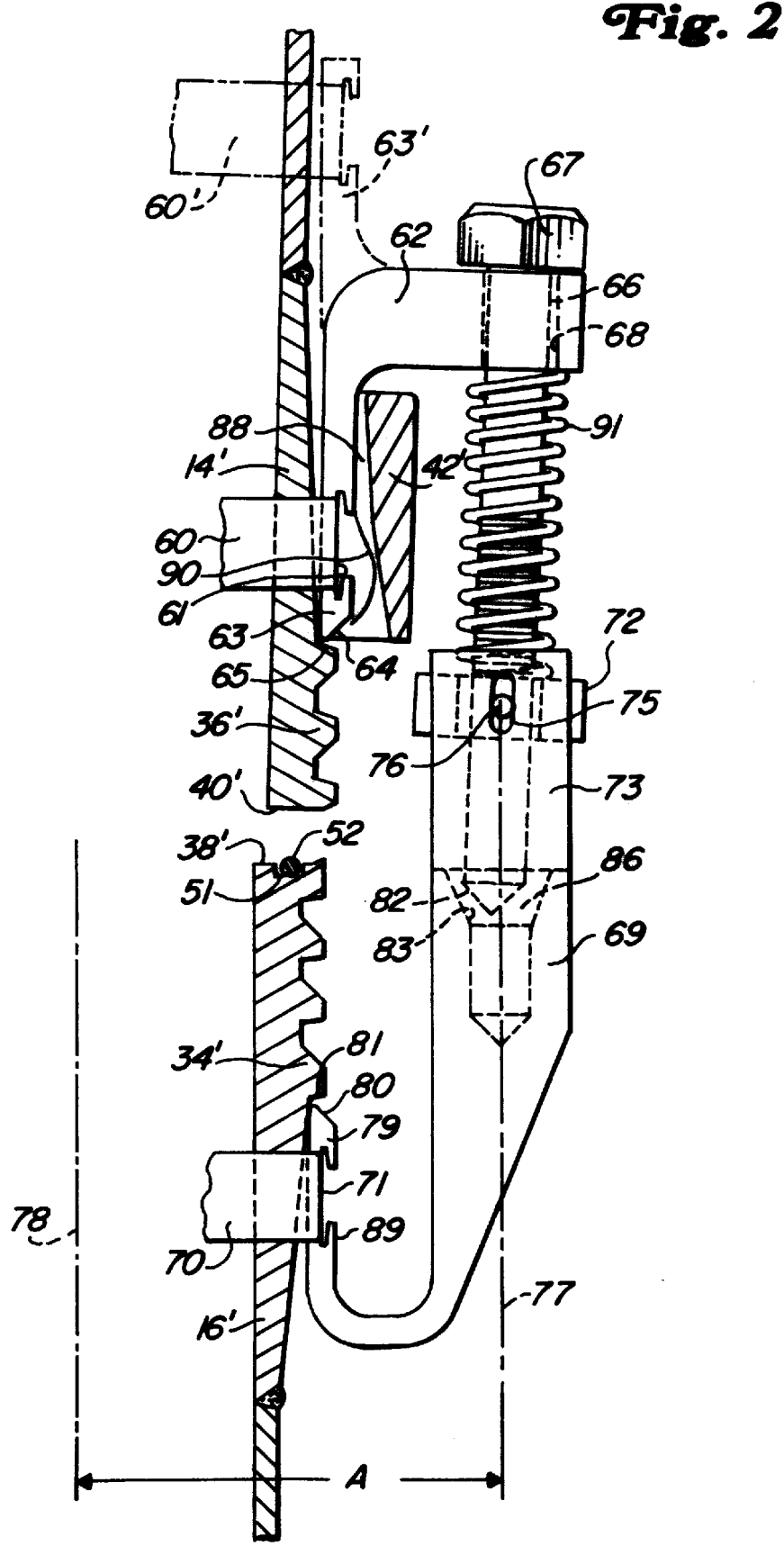
FIG. 2 shows the tool of this invention attached to a pipe connection of the type shown in FIG. 1 before the alignment of the connection ends.

FIGS. 2 and 3 show a slightly modified form of the connection from that shown in FIG. 1. For example the connector face 38' shows an optional groove 51 for retaining an O-ring gasket 52. Gasket 52 may be used for high pressure sealing. In other cases where conduits are used to conduct particle flows, establishing absolutely tight gas or liquid seals may not be a requirement of the connections. The connection of FIGS. 2 and 3 also does not show a shoulder 50 separate from the extended ribs 34' and 36'. In this manner FIGS. 2 and 3 demonstrate the use of an outer portion of the extended ribs 36' as a shoulder for engagement of the clamp device.

FIGS. 2, 3, and 4 show one form of the tool of this invention in more detail. A Bracket 62 has an L-shape with one of its legs in the form of a finger 63 that has a distal end 64 for engaging a shoulder or other ledge 65 on connection half 14'. A clamp 60 in the form of a circumferential strap, preferably a metallic band, fixes L-shaped bracket 62 to a connection half 14'. Clamp 60 has a suitable tensioning lever or bolt (not shown) that firmly retains bracket 62 against connection half 14'. The clamp may be a separate piece that is held in place by a groove 61 as shown in the FIGS. 2 and 3 or may be an integral part of the bracket.

FIG. 2 also shows an alternate arrangement for clamping bracket 62 to the connection half 14'. Instead of placing the clamp near the ribs 36' of the connection half, a finger 63' may extend away from the connection half 14'. Finger 63' retains a clamp 60' that secures the bracket 62 to a more removed section of connection half 14' or to its associated pipe section. The bracket 62 may use both fingers 63 and 63' or finger 63' may be used alone. Where finger 63' is used without finger 63, the clamp may develop sufficient force to keep bracket 62 from sliding toward the ribs of the connection half without any direct contact of the bracket 62 with a shoulder or other ledge on the connection half.

Bracket 62 is also referred to as a retaining bracket since it retains the shank 66 of a bolt 67 in a hole 68. Bolt 67 serves as a tensioner for engaging a J-shaped bracket 69. Another clamp 70 in the form of a circumferential band, similar to that described in conjunction with reference numeral 60, holds bracket 69 in place against pipe connection 16' while a groove 71 retains the circumferential band 70 in position with respect to bracket 69. Bracket 69 is also referred to as a receiving bracket since it receives the end of bolt 67. An elongate finger 79 of receiving bracket 69 has an end 80 that again contacts a shoulder or ledge 81 of pipe connection half 16'.

Initially, when first applied to the connection halves, the tool starts in an extended position that permits initial misalignment of the pipe connection 14' and pipe connection 16'. The tensioner engages a threaded surface in the form of a nut 72. Opposing arms 73 of a yolk structure 74 (See FIG. 4) define a pair of slots 75 for retaining a pair of studs 76 that each extend from an opposite side of nut 72. Receiving bracket 69 has an axial axis 77 that is radially offset from the primary axis 78 of connection 16' by distance "A". The sides of slots 75 interact with studs 76 to restrain movement of the nut about the common axis of the studs such that translational movement of the nut only occurs in a plane perpendicular to the radial offset line of dimension "A". Hole 68 may be oversized to permit some rotation of bolt shank 66 when initially connecting the tool to the misaligned pipe halves.

A distal end 82 of bolt 67 provides an alignment surface that contacts a cooperating alignment surface 83 defined by a tapered portion of a bore 86 located in receiving bracket 69. Distal end 82 is tapered in the form of a cone and cooperates with the surface 83 that is tapered into a frustral conical form. Simple rotation of bolt 67 in nut 72 draws surfaces 82 and 83 into contact and then causes angular alignment of brackets 62 and 69 as contact surfaces 40' and 38' are brought together.

As shown in FIG. 3, continued drawing down of bolt 67 through nut 72 aligns a preferably unthreaded end 84 of bolt 67 into a straight walled portion 85 of bore 86. Location of bolt end 84 into the straight bore portion 85 provides an axial alignment of connection halves 14' and 16' such that any remaining axial spacing between contact surfaces 38' and 40' may be taken up by further drawing together of the brackets with bolt 67.

Continued drawing down of the bolt 67 moves the tool into a contracted position that coaxially aligns the connection halves and brings the contact surfaces 38' and 40' into the desired proximity. Connection halves 14' and 16' may also have misalignment in a plane perpendicular to radial offset line "A". The drawing down of bolt 67 into nut 72 also corrects this misalignment as studs 76 contact the top of slots 75.

To control spacing of the brackets during installation on the pipe ends, the brackets may be restrained so that bolt 67 controls the relative spacing at all times. Spacing may be controlled by limiting axial displacement of bolt 67 with respect to bracket 62 by the use of an appropriate retaining clip. Alternately, FIGS. 2 through 4 show a resilient member, in the form of a spring 91, that urges the brackets apart by acting against inner surface 87 of bracket 62 and the top of nut 72.

The finger of the respective L-shaped and J-shaped brackets 62 and 69 may provide recess areas 88 and 89, respectively. Either recess area may retain a locking ring 42' in a position that is removed from the contact area of extended ribs 34' and 36'. Retaining the locking ring 42' in the recess areas provides clearance for installation of the connecting links (not shown). A retaining clip 90 may be provided to retain locking ring 42' when it is located above contact area ribs 36' and 34'.

The connection tool may provide the recess area in a number of different ways. Furthermore, only one recess area may be provided ahead or behind the contact area of ribs 34' and 36' by either of the brackets. For example, the circumferential clamp 60 may be eliminated and a clamp for a modified bracket 62 may be provided by replacing the L-bracket configuration with a split ring that bolts onto connector half 14' at a location that is axially removed from the contact surface of ribs 36'. The recess area may then be provided by the receiving bracket. An additional recess space may be provided by changing the J-shape of the receiving bracket to a U-shape to provide additional recess area.

What is claimed:

1. A connection tool for alignment of components when installing pipe connectors of the type that join conduits in a piping arrangement about a primary axis and use first and second connection halves having connector faces at each end of each connection half; external contact surfaces defined by each connection half that extend at least intermittently around the periphery of each connection half in a transverse direction, that face away from its respective connector face and that extend from the outer surface of each connection half at an angle of at least 90 degrees with respect the axis of the connection halves to define a perpendicular or a ramped surface; at least two links adapted to each extend partially around the outside of the first and second connection halves, each link defining contact surfaces that extend at least intermittently around the interior of each link in a transverse direction for engaging the external contact surfaces; and a locking member extending at least partially around and in engagement with the links to securely engage the contact surfaces of the links with the external contact surfaces, the connection tool comprising:
a first bracket for engaging a portion of the first connection half that is axially removed from the contact surface of the first connection half;
a second bracket for engaging a portion of the second connection half that is axially removed from the contact surface of the second connection half having a second clamp to secure the second bracket with respect to the second connection half;
a tensioner having an extended position for joining the first and second brackets while the first and second connection halves are misaligned and a contracted position that coaxially aligns the first and second connection halves by drawing the first and second brackets closer together and producing aligning engagement between a first alignment surface defined by the first bracket and a second alignment surface defined by the tensioner or the second bracket; and
a recess defined by the first or second bracket for retaining the locking member in a position that is axially removed from the contact surface of each connection half.

2. The apparatus of claim 1 wherein the connection halves define shoulders and the brackets engage shoulders on the connection halves.

3. The apparatus of claim 2 wherein at least one of the brackets defines an elongate finger that engages the shoulder of a connection half.

4. The apparatus of claim 1 wherein at least one of the brackets defines an elongate finger and the locking member is axially aligned with a portion of the finger when retained in the recess.

5. The apparatus of claim 1 wherein the bracket defining the recess includes a retaining clip to hold the locking ring in a position for axial removal from the contact surfaces.

6. The apparatus of claim 1 wherein the first clamp or the second comprises a metallic band and its respective bracket defines a groove for receiving a portion of the band.

7. The apparatus of claim 1 wherein the tensioner defines the second clamp alignment surface.

8. The apparatus of claim 7 wherein the tensioner comprises a threaded bolt that engages the second bracket and that engages a threaded surface retained by the first bracket.

9. The apparatus of claim 8 wherein the threaded surface comprises a nut.

10. The apparatus of claim 9 wherein a portion of the first bracket is offset from the first connection half along a radial line, a pair of studs extend transversely from opposite sides of the nut and a pair of slots, extended in the axial direction of the first connection, retain the pair of studs and restrain the common axis of the studs to movement in a plane perpendicular to the radial line along which the first bracket is offset from the first connection half.

11. The apparatus of claim 8 wherein the first alignment surface comprises a tapered bore and the second alignment surface comprises a tapered end of the bolt.

12. The apparatus of claim 1 wherein a resilient member urges the first and second brackets apart.

13. The apparatus of claim 1 wherein the threaded bolt extends through a spring that urges the first and second brackets apart.

14. A connection tool for joining pipe connectors, the tool comprising:

a bolt having a contact surface at its distil end;

a retaining bracket having a threaded bolt retainer for retaining the bolt and having a clamp retainer;

a retaining clamp to secure the retaining bracket to a pipe connector;

a receiving bracket having an alignment surface and a clamp retainer, wherein the receiving bracket retains a threaded member for engaging the threads of the bolt and bringing the retaining and receiving brackets into axial and angular alignment by movement of the contact surface along the alignment surface; and a receiving clamp to secure the receiving bracket to a pipe connector.

15. The apparatus of claim 14 wherein the retaining bracket has an "L" shape and one leg of the "L" provides an elongate finger with an end that contacts a pipe connector.

16. The apparatus of claim 15 wherein the other leg of the "L" defines a hole for receiving the shank of the bolt.

17. The apparatus of claim 14 wherein the receiving bracket has a "U" or a "J" shape that provides upturned ends and one upturned end provides a finger with a distil end for contacting a pipe connector and the other defines a tapered bore to provide the alignment surface.

18. The apparatus of claim 14 wherein the threaded member comprises a nut and a pair of slots defined by the receiving bracket retain a pair of studs that extend from the nut to permit axial displacement and angular movement of the nut relative to the receiving bracket.

19. The apparatus of claim 18 wherein the bolt extends through a spring and acts against the receiving bracket and the nut to maintain controlled spacing between the retaining and receiving brackets through rotation of the nut.

20. The apparatus of claim 14 wherein at least on of the retaining or receiving brackets defines a recess and includes a retaining clip to hold a locking ring of pipe connector.

* * * * *